United States Patent [19]
Fauser et al.

[11] 3,916,855
[45] Nov. 4, 1975

[54] ELECTRONIC IGNITION TIMING AND TIMING SHIFT CIRCUIT FOR INTERNAL COMBUSTION ENGINES

[75] Inventors: Edwin Fauser, Sersheim; Günter Schirmer, Ingersheim; Leo Steinke, Hegnach; Rainer Hellberg, Ludwigsburg, all of Germany

[73] Assignee: Robert Bosch GmbH, Stuttgart, Germany

[22] Filed: Jan. 9, 1974

[21] Appl. No.: 431,880

[30] Foreign Application Priority Data
Jan. 12, 1973 Germany............................ 2301352

[52] U.S. Cl. ........................ 123/117 R; 123/148 E
[51] Int. Cl.² ........................................... F02P 5/04
[58] Field of Search...... 123/148 E, 148 OC, 117 R, 123/146.5 A

[56] References Cited
UNITED STATES PATENTS

| | | |
|---|---|---|
| 3,738,339 | 6/1973 | Huntzinger..................... 123/148 E |
| 3,756,212 | 9/1973 | Schirmer......................... 123/148 E |
| 3,799,136 | 3/1974 | Korteling........................ 123/148 E |
| 3,811,420 | 5/1974 | Vogel.............................. 123/148 E |
| 3,815,560 | 6/1974 | Wahl............................... 123/148 E |
| 3,831,571 | 8/1974 | Weber............................. 123/148 E |

*Primary Examiner*—Charles J. Myhre
*Assistant Examiner*—Ronald B. Cox
*Attorney, Agent, or Firm*—William R. Woodward

[57] ABSTRACT

At low speeds ignition timing is determined by the trailing edge of a series of pulses triggered by a transmitting device connected to the engine, but at high speeds the timing is switched to a series of pulses advanced in phase triggered by coincidence of the voltage of a sawtooth wave with a voltage dependent on a function of engine speed and engine operation parameters such as temperature and intake vacuum, which function determines the amount of ignition advance. Pulses generated at a rate determined by engine speed arrest the rise of a sawtooth voltage and the sawtooth wave generator is restarted after the peak voltage thus fixed is stored. This stored voltage is inversely proportional to engine speed and is used to control the ignition timing shift switch, as well as to generate a function of engine speed and other engine operation parameters to determine the amount of timing shift.

8 Claims, 10 Drawing Figures

ELECTRONIC IGNITION TIMING AND TIMING SHIFT CIRCUIT FOR INTERNAL COMBUSTION ENGINES

The invention relates to electronically controlled ignition systems for internal combustion engines, and in particular a system in which the shifting of the ignition timing is automatically controlled by a combination of factors individually supplied to the electronic control.

Conventional ignition timing systems providing for shift of the timing, as provided for motor vehicles, change the ignition timing in dependence on the intake vacuum at the throttle of the carburetor in accordance to particular operation characteristics that are provided by means of centrifugal weights and membrane pressure sensors acting on mechanical interrupter contact shifting devices. Only a limited family of characteristic curves are available by these techniques. As a result of new developments in the field of internal combustion engines, particularly to meet the requirements or guidelines prescribed regarding detoxification of exhaust gases, it will soon be desirable or even necessary to have a set of characteristics involving a much greater multiplicity of factors taken into account to determine the shifting of the ignition timing.

It is accordingly an object of the invention to provide a system of electronic ignition timing shift for internal combustion engines in which the choice of operating characteristics and of influencing factors offers the greatest possible freedom of selection and combination.

SUBJECT MATTER OF THE PRESENT INVENTION

Briefly, measured factors are combined in an adder stage, the result of which provides one input of a multiplier stage, at the other input of which a signal is applied derived from a pulse generator stage through a sawtooth wave generator and a maximum value storage device, with the output of the multiplier stage being fed to a comparator to which the output of the said pulse generator stage, as modified by the sawtooth generator, is also supplied, the output of the comparator and the direct output of the pulse generator being used to produce the ignition timing pulses.

With the system of the invention, it is possible to take account of any desired number of influencing factors, as, for example, the temperature of the engine, air pressure and air moisture content, carborator vacuum, etc., for determining the amount of ignition timing shift.

The invention will be described by way of example with reference to the annexed drawings, in which.

Figure 1:
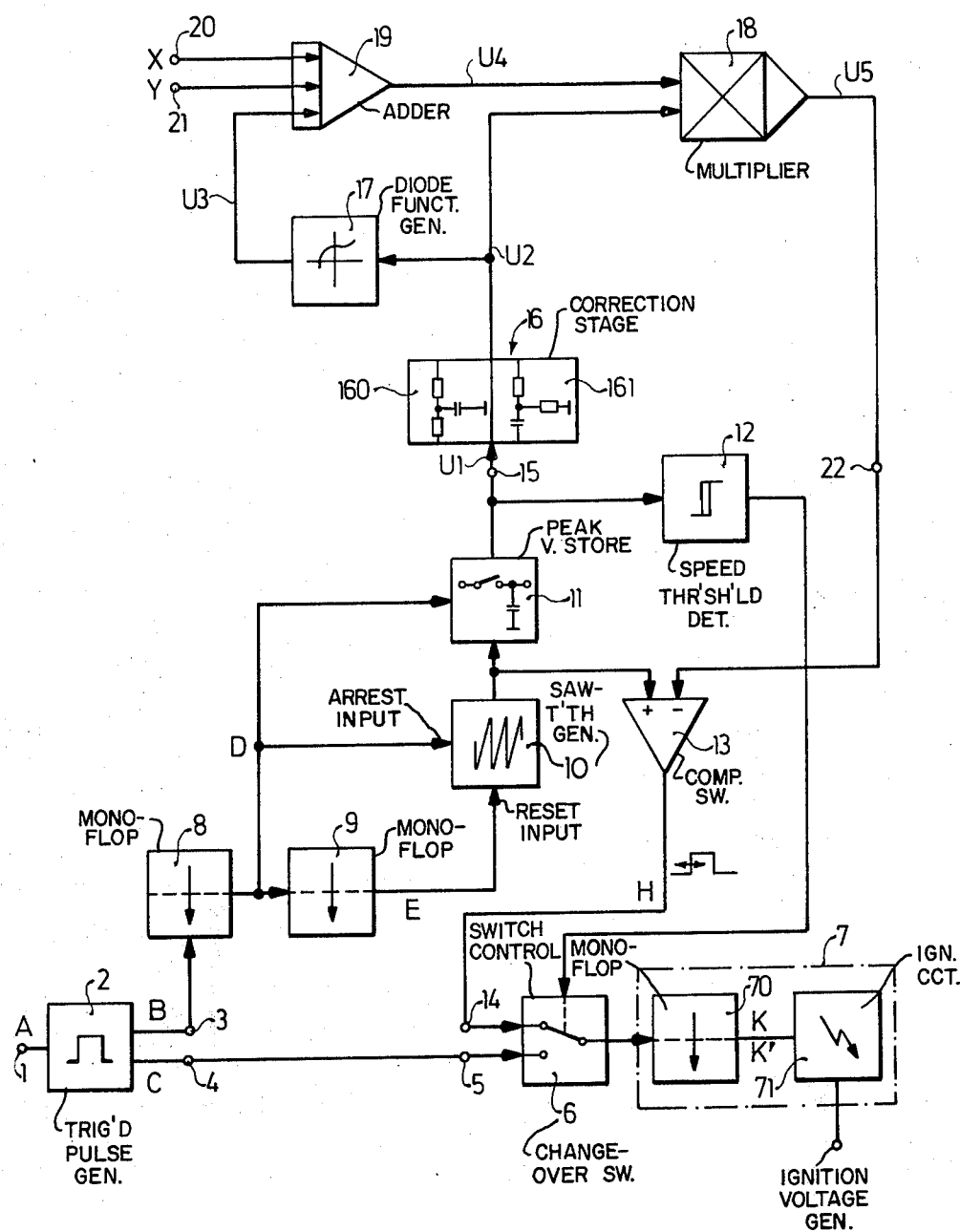
FIG. 1 is a block diagram of a system according to the invention.
Figure 2:
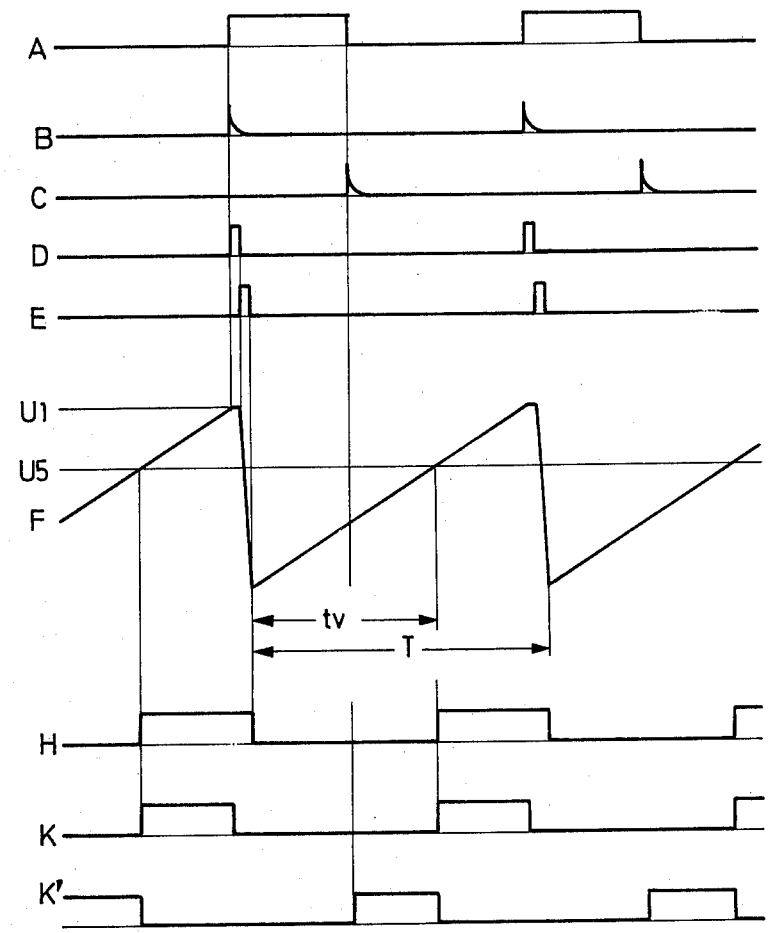
FIG. 2 is a timing diagram, in the form of a family of curves, showing the course of voltages in the system of FIG. 1.

The system shown in FIG. 1 is controlled by a pulse transmitter connected to the crankshaft of an internal combustion engine that is not shown in the drawing, the pulse transmitter being, for example, a carrier frequency transmitter, an optical transmitter, an inductive transmitter, or the like. This control proceeds in such a manner that, for example, exactly 30° before the upper deadpoint (UD) and in the upper deadpoint, pulse edges are produced (see curve A in FIG. 2) which are furnished over the terminal 1 to a triggered pulse generator stage 2 that is preferably in the form of a Schmitt trigger circuit. The input information is transformed in the pulse generator stage 2 in such a way that at its first output 3 a pulse sequence B is available and at its second output 4 a pulse sequence C is available. The output 4 is connected directly with the first input 5 of a speed dependent changeover switch 6, the output of which is connected to an ignition voltage generator stage 7 consisting of a monostable switching stage 70 controlling a known type of ignition circuit 71, which includes a distributor circuit if the engine has more than one cylinder. The ingition pulses are available at the output of the ignition voltage generator stage 7.

The output 3 of the pulse generator stage 2 is connected to a monostable switching stage 8, at the output of which the pulse sequence D is formed. The output of the monostable switching stage 8 is on the one hand connected to a further monostable switching stage 9, and on the other hand to the arresting input of a sawtooth generator 10, as well as to the control input of a maximum value storage circuit 11. The leading edge of the pulse D stops the rise of the sawtooth voltage F delivered by the sawtooth generator 10 and this peak limited voltage value $U_1$ is transferred to the maximum value store 11. The trailing edge of the pulse D activates the second monostable switching stage 9 which produces a pulse sequence E. The sawtooth generator 10 is reset by the trailing edge of this impulse E, so that the sawtooth voltage F can again rise proportionally to the lapse of time. The peak value storage device 11 makes available the stored voltage $U_1$ at low impedance to a speed threshold value stage 12. The latter compares the voltage $U_1$ with a predetermined value and switches the changeover switch 6 in accordance with the speed in such a way that at low speeds the pulses C are switched through, whereas at higher speeds the pulses coming from the comparator stage 13, the pulses H present at the second input 14 of the changeover switch 6, are switched on through. A monostable switching stage 70 contained in an ignition pulse generator stage 7 is activated by the positive edge of the pulse C or of the pulse H and produces defined pulses K′ or K that are such as to be transformed into ignition pulses in a known type of electronic ignition pulse generation stage 71. The output voltage $U_1$ of the maximum value storage circuit 11 is also supplied over a switching point 15 to a correction stage 16 used for providing timing shift dependent upon acceleration by which a differential and/or integral component is produced and superimposed upon the proportional component to be transmitted. This correction stage 16 is constituted as a parallel connection of a low pass filter 160 and a high pass filter 161. The voltage $U_2$ available at the output of the correction stage 16 is on the one hand provided to a function generator 17 of a diode type known from analog computation technology, and on the other hand to one of the inputs of a multiplier stage 18.

The output voltage $U_3$ of the function generator 17 is applied to the first input of an addition stage 19, to the other inputs 20 and 21, of which the influencing factors X and Y (e.g., voltages, currents or resistances) are present, these influencing factors being functions of operation parameters of the internal combustion engine, as e.g., temperature or carburetor vacuum. The influencing factor magnitudes are supplied to the adder stage and added or subtracted as the case may be, thereby forming the voltage $U_4$ that appears at the output of the adder stage. This voltage $U_4$ is supplied to the second input of the multiplier stage 18. The output voltage $U_5$ available at the output of the multiplier stage then becomes:

$$U_5 = U_2 \cdot U_4 = f(U_1) \cdot U_1 \cdot (X + Y + f_1(U_1, U_1))$$

in which expression $x$ would designate the time derivative $dx/dt$ and $U$, therefore, the corresponding derivative $dU/dt$.

This output voltage is supplied to the second input of the comparator stage 13 over the circuit point 22. The output voltage H of the comparator stage 13 takes on a new value every time as soon as the sawtooth voltage F exceeds the voltage $U_5$ and goes back to the initial value, as soon as the sawtooth voltage falls below the voltage $U_5$. For the time $t_r$ of the beginning of the sawtooth voltage rise and lasting until the voltage $U_5$ is reached, the following relations hold:

$$t_r = T \cdot U_5/U_1$$

or $$t_r/T = f(U_1) \cdot (X + Y + f(U_1) \cdot U_1)$$

Since $U_1$ is proportional to the rise time $T$ and thus inversely proportional to the speed $n$ of the internal combustion engine, and since $T$ always corresponds to a particular angular displacement of the crankshaft, which means that $t_r/T$ also represents an angular relation, the result is obtained that:

$$\alpha_z \sim g(n) \cdot (X + Y + g(n, n))$$

The voltage jump H which triggers ignition over the switching circuit 6 and the ignition voltage generator stage 7, thus takes place at a particular position of the crankshaft given by the angle $\alpha_z$.

Figure 3:
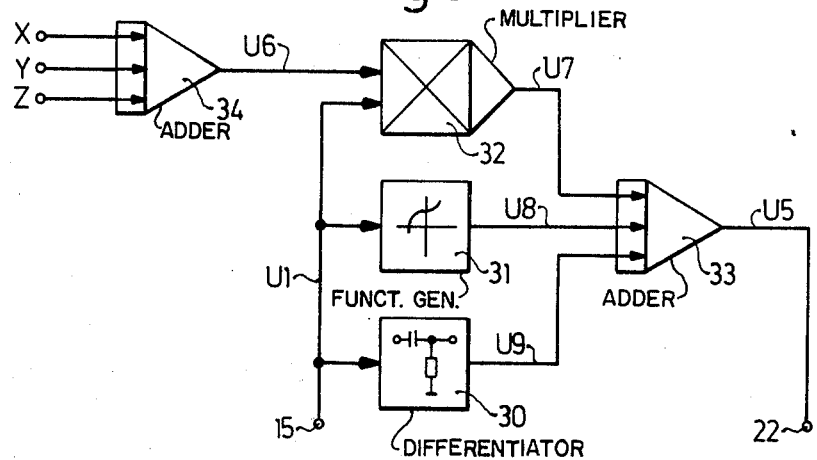
FIG. 3 is a block diagram of a portion of the circuit shown in FIG. 1.

The block diagram shown in FIG. 3 can take the place of the blocks 16 through 19 of FIG. 1. The connection for the substitution is made at the circuit points 15 and 22. The output voltage $U_1$ of the peak store 11 of FIG. 1 is applied in the circuit of FIG. 3 over the terminal 15 simultaneously to the input of a differentiating stage 30, to the input of a function generator 31 and to a first input of a multiplier stage 32. The outputs of the three circuit components must mentioned are respectively connected to the three inputs of a second adding stage 33, the output of which goes, over the terminal 22 to one input of the comparator stage 13 of FIG. 1. The output of a second adding stage 34 having three inputs is connected to the second input of the multiplier stage 32. The voltage $U_6$ applied to the second input of the multiplier 32 is generated by the first adding stage 34, that adds the modifying factors X, Y and Z together algebraically (that is, adding or subtracting as may be appropriate). These modifying factors are again voltages or currents dependent upon the operating parameters of the internal combustion engine, as for example temperature and intake vacuum. The voltage $U_8 = f(U_1) \cdot U_1$ is formed at the output of the function generator generating the desired ignition timing shift characteristic, while the voltage $U_9 = f(U_1)$ is produced at the output of the differentiating stage 30. At the output of the first adding stage 33, therefore, is found the voltage:

$$U_5 = U_7 + U_8 + U_9 = U_1(X + Y + Z) + U_1 \cdot f(U_1) + f(U_1).$$

Transformation of these relations in terms of the crankshaft angle $\alpha_z$ at which the ignition is timed is carried out in a manner similar to that described in connection with FIG. 1. There is accordingly obtained for the crankshaft angle:

$$\alpha_z \sim X + Y + Z + g(n, n).$$

Figure 4:
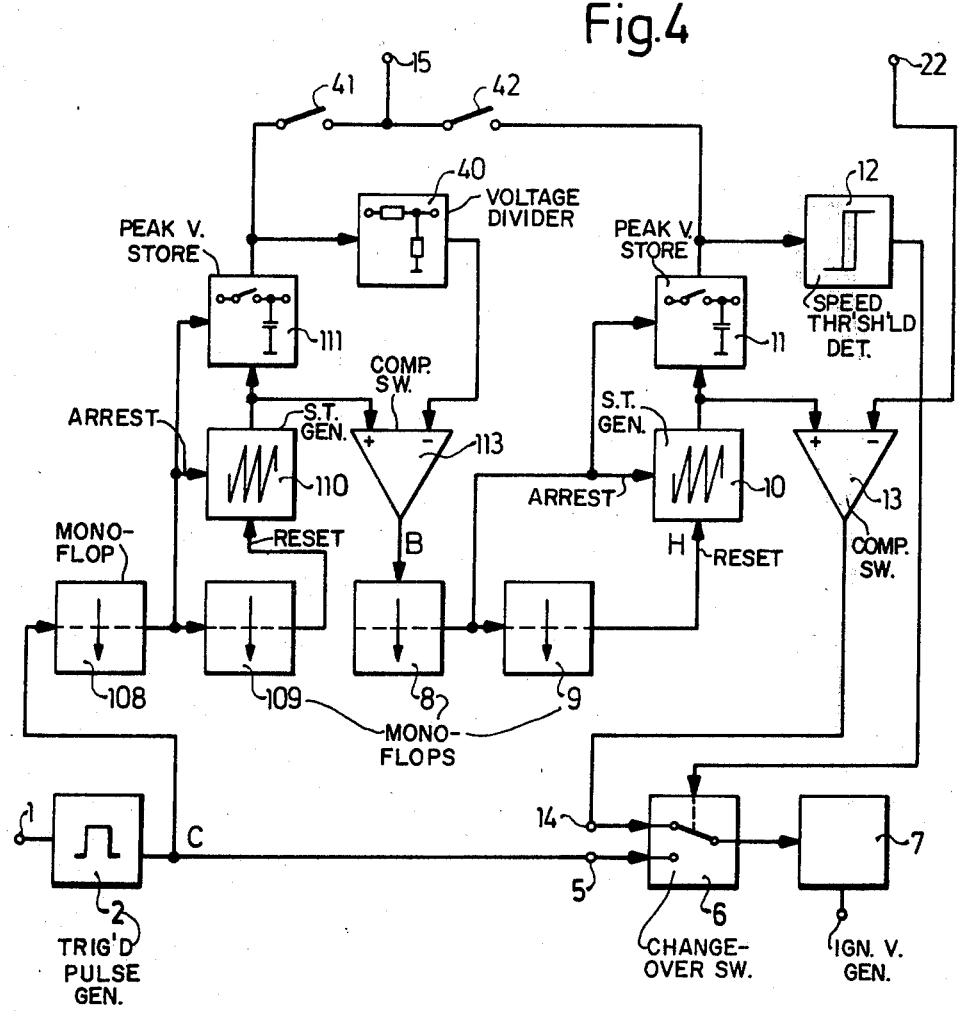
FIG. 4 is a block diagram of a portion of an apparatus according to the invention for control with only a single pulse.

The circuit of which FIG. 4 provides a block diagram is for use when the transmitting device of the internal combustion engine for controlling the ignition timing provides only a single pulse, for example at the upper deadpoint previously mentioned. The circuit of FIG. 4 can be connected over the circuit points 15 and 22 with the circuit of FIG. 3 or with the circuit blocks 16–19 of FIG. 1. The circuit can be developed from FIG. 1 by duplication of the blocks 8, 9, 10, 11 and 13. Reference numbers raised by 100 over the corresponding reference numbers of FIG. 1 designate the blocks of the first complex, which is connected to the output of the pulse generator stage 2 and is distinguished from the arrangement according to FIG. 1 by the fact that the output of the peak store 111 is not connected to a speed-responsive discriminator stage, but is connected rather, over a voltage divider 40, with the second input of the comparator stage 113. This first complex therefore generates a constant shift angle $\alpha_k$, which is determined by the division ratio of the voltage divider 40.

The first monostable switching stage 8 of the second complex of FIG. 4, which is fully identical with the circuit of FIG. 1, thus always receives a trigger pulse B timed at a particular angle of crankshaft rotation ahead of the upper deadpoint. The mode of operation accordingly corresponds to that of FIG. 1. The changeover switch 6 is controlled by a speed-responsive discriminator stage 12 just as in FIG. 1, so that at low speeds the pulses C of the pulse generator stage 2 and at high speeds the pulses H from the comparator stage 13 are connected to the output of the changeover switch 6. The circuit point 15 is connected, according to the switching position of two switches 41 and 42, with one of the two peak stores 111 and 11. Connection with the peak store 111 provides a better dynamic behavior, whereas the other connection gives higher accuracy.

Figure 5:
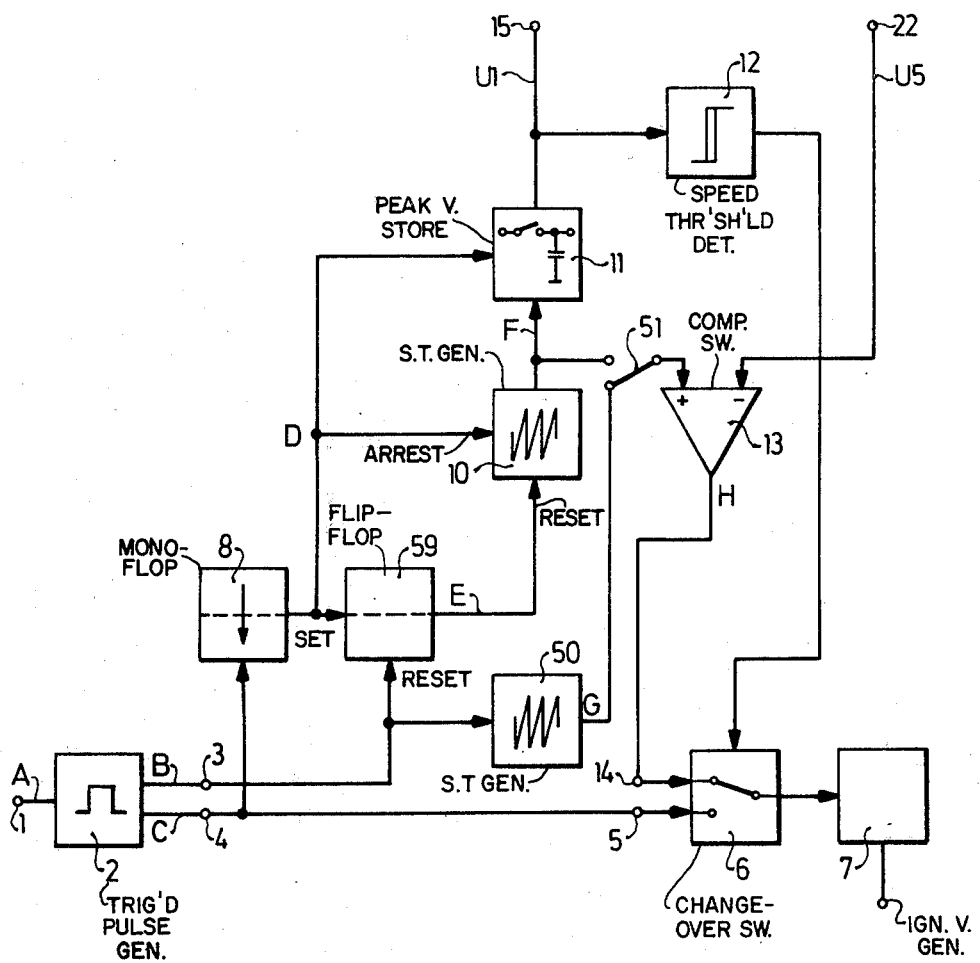
FIG. 5 is a block diagram of a portion of an apparatus according to the invention for unsymmetrically offset cylinders of an internal combustion engine.
Figure 6:
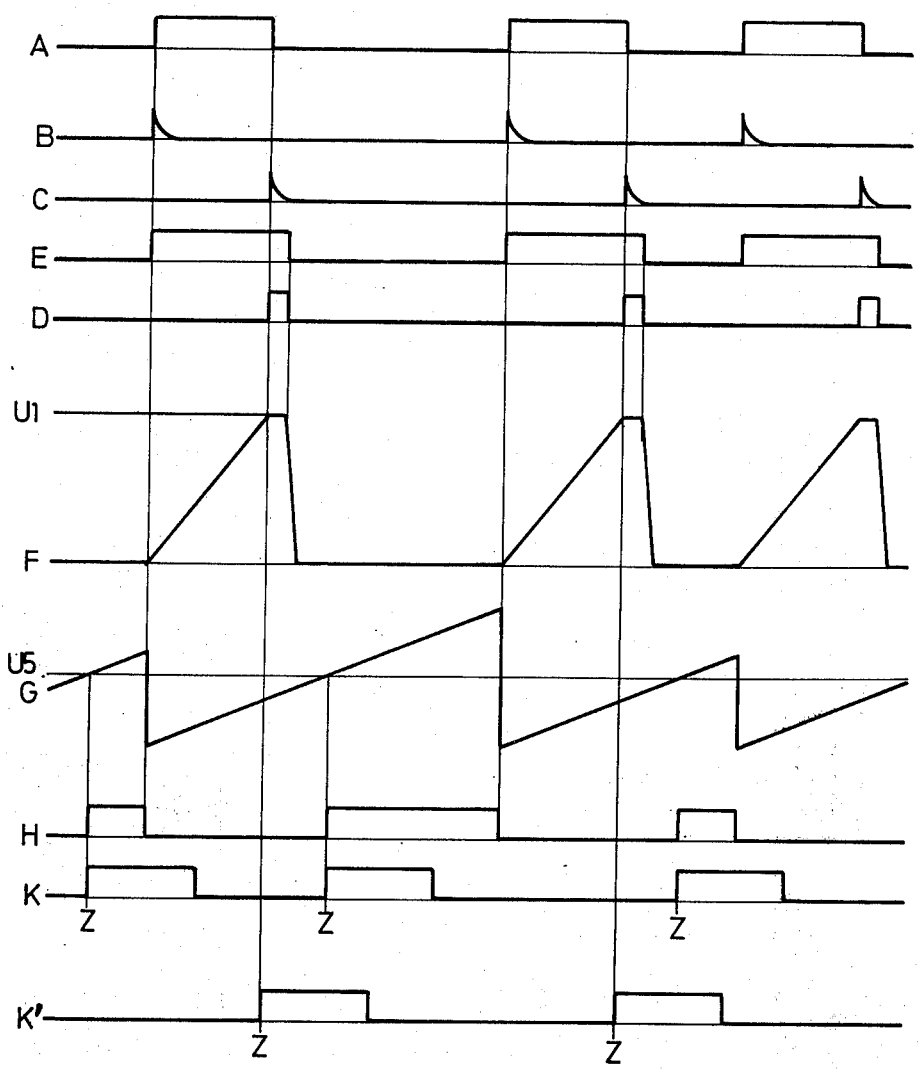
FIG. 6 is a timing diagram in the form of a family of curves showing voltages in the circuit of FIG. 5.

The circuits described up to now are based on the assumption that the cylinders of the engine are symmetrically offset from each other (in firing time). The block diagram of FIG. 5 is provided for an asymmetric cylinder arrangement and represents a modified circuit for the arrangement of FIG. 1. The differences from the circuit of FIG. 1 are that instead of the second monostable switching stage 9, a bistable switching stage 59 has been provided that is triggered by the voltage pulse B at the output 3 of the pulse generator stage 2 and is reset by the trailing edge of the pulse at the output of the monostable switching stage 8. The input of the monostable flipflop 8 is connected with the second output 4 of the pulse generator stage 2. The voltage and pulse relations for this circuit are shown in the timing diagram of FIG. 6. The output 3 of the pulse generator stage 2 is, besides, connected to the input of a second sawtooth generator 50, which is started every time it receives a pulse of the sequence B. The sawtooth voltage G is applied over a switch 51 to the first input of the comparator stage 13 and effects the beginning or the end, as the case may be, of a signal H when the sawtooth voltage G rises above or falls below, respectively, the voltage $U_5$. In this circuit the second sawtooth generator 50 thus produces a shift of the ignition time when the changeover switch 6 takes its position corresponding to the higher speed condition. The remainder of the circuit and its manner of operation corresponds to the circuit of FIG. 1 and its operation.

If it is not necessary to provide ignition after the upper deadpoint, the output of the first sawtooth generator 10 is connected with the first input of the comparator stage 13 by actuation of the changeover switch 51. The second sawtooth generator 50 can then be dispensed with. Ignition is now triggered as in FIG. 1 when the sawtooth voltage F of the first sawtooth generator 10 rises above the output voltage $U_5$ of the multiplier stage 18, or of the adding stage 33 of FIG. 3.

Figure 7:
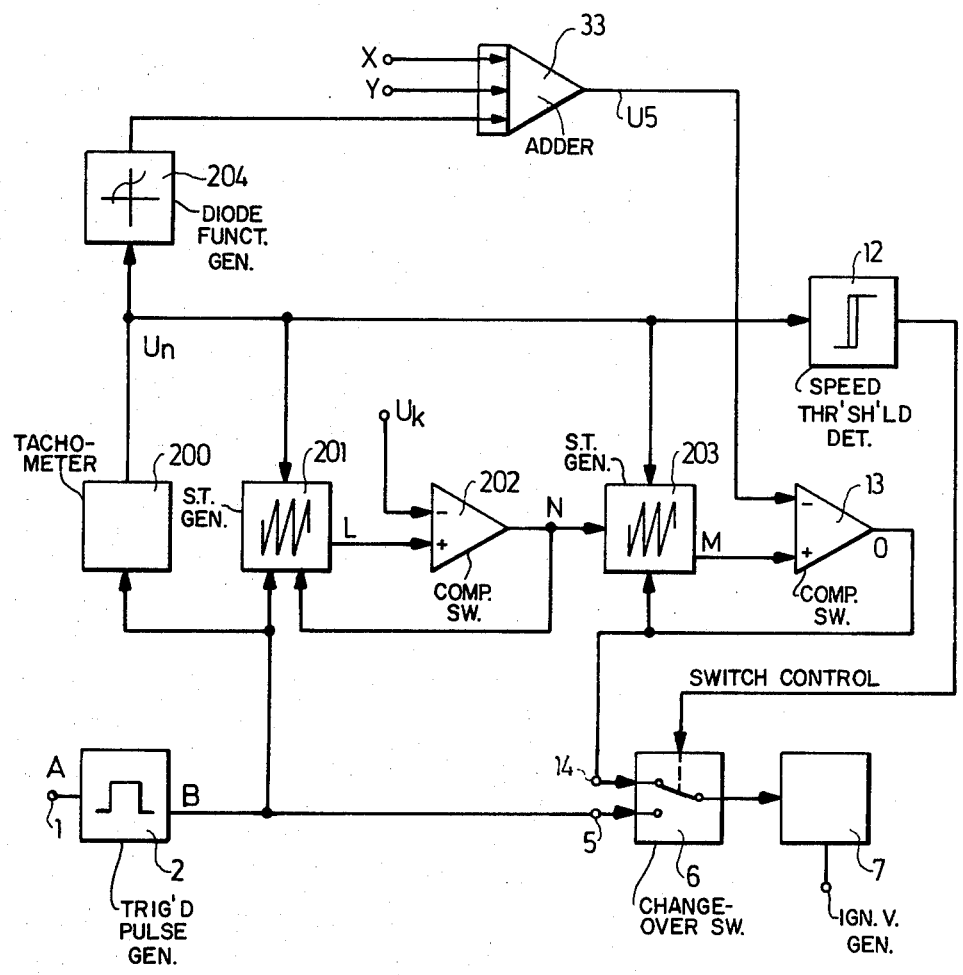
FIG. 7 is a block diagram of a further embodiment of a system according to the invention.
Figure 8:
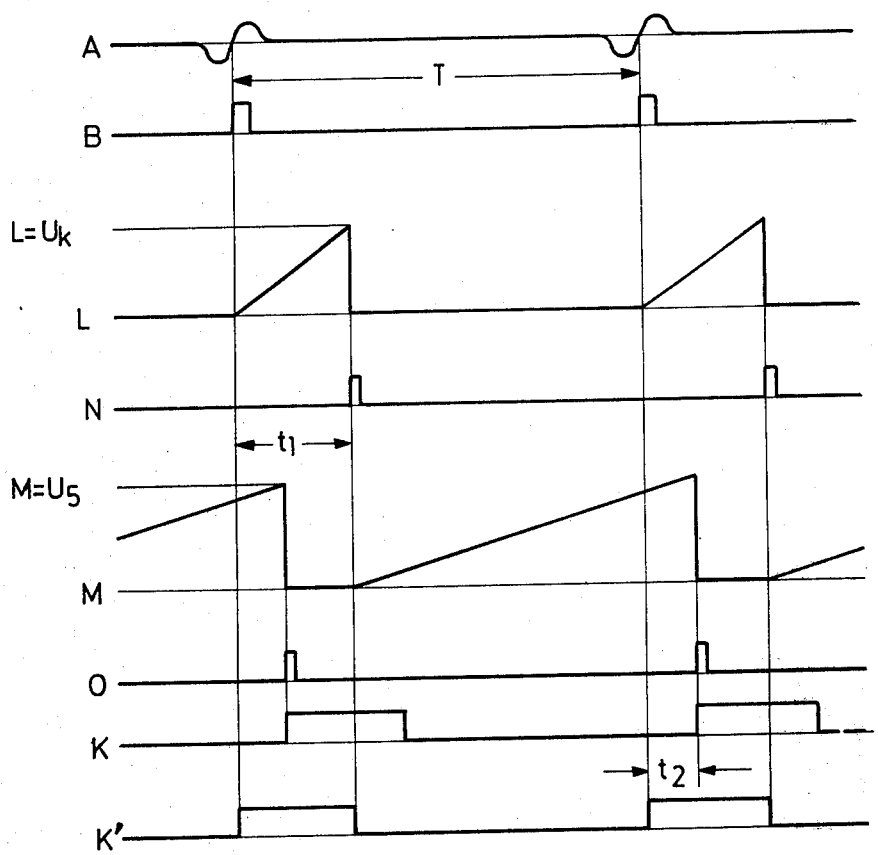
FIG. 8 is a timing diagram in the form of a family of curves showing voltages in the system of FIG. 7.

The block diagram circuit given in FIG. 7, like that of FIG. 4 requires only one pulse from the transmitting device of the engine (e.g. at the upper deadpoint); in contrast with the circuits described up to now, however, it operates with voltage controlled sawtooth generators and thus works without any multiplier stage. The pulses and voltages produced are shown diagrammatically in FIG. 8. The signal A produced by the transmitting device coupled to the motor, appears at the output of the pulse generator stage 2 as the signal B and is supplied therefrom to a tachometer 200. The latter provides an output voltage $U_n$ proportional to the engine speed $n = 1/T$. The voltage $U_n$ is supplied to a first sawtooth generator 201 and to a second sawtooth generator 202. The output voltage of the sawtooth generators rises proportional to time and to the voltage $U_n$ supplied to these circuits, so that the following relation holds for the output voltages:

$L(M) \sim U_n \cdot T$

A comparator stage 202 compares the output voltage L of the first sawtooth generator 201 with a constant voltage $U_k$ and generates a signal N when the two input voltages are equal. This signal N acts as an extinguishing (reset) pulse at a second input of the sawtooth generator 201. At the third input of the sawtooth generator 201 the output signal B of the pulse generator stage 2 is applied, which initiates the voltage rise of the sawtooth wave.

The output signal N of the comparison stage 202 is supplied to a second input of the second sawtooth generator 203 and operates as a starting pulse. The output voltage M of the second sawtooth generator 203 is compared with the output voltage of the adding stage 33 in the second comparator 13. The output voltage of the adding circuit 33 is produced by algebraic addition (addition or subtraction as may be appropriate) of a speed responsive voltage at the output of a function generator 204, the input of which is connected to the output of the tachometer 200, and two modifying factors X and Y that are functions of operating parameters of the engine, as for example temperature and intake vacuum. When the voltages at the inputs of the second comparator stage 13 are equal, a signal O appears at its output which is provided, on the one hand, as an extinguishing pulse to the second sawtooth generator 203 and, on the other hand, as in the previous embodiments, to one terminal 14 of the changeover switch 6 to the other terminal 5 of which the output signal B of the pulse generator stage 2 is supplied. The speed-responsive switching over of the switching stage 6 takes place as in the previous examples by operation of the speed-responsive discriminator stage 12, to the input of which the speed-dependent voltage $U_n$ is supplied. The remainder of the circuit and its manner of operation corresponds to the previous examples and the related voltages are correspondingly shown in FIG. 11. The variation of the angle of shift follows the following proportionality: $\alpha_z \sim f(n) + Y + Z$.

Figure 9:
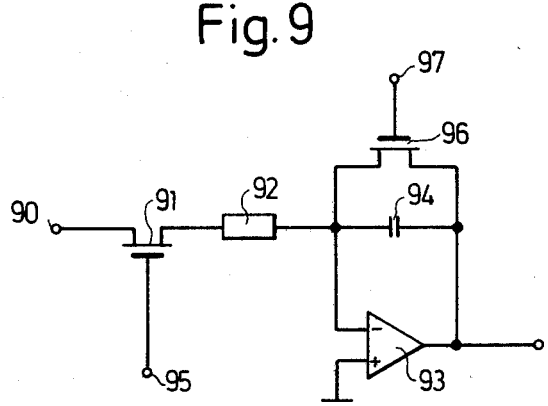
FIG. 9 is an illustrated embodiment of a sawtooth generator for use in the system of the invention.

The embodiment illustrated by way of example in FIG. 9 for a sawtooth generator can be used in the circuits of FIGS. 1, 4, 5 and 7. The input 90 on which a voltage proportional to the sawtooth slope is applied is connected over the channel of a first field effect transistor (FET) 91 and over a resistor 42 to the input of an operational amplifier 93 which has its second input grounded. The operational amplifier 93 is provided with negative feedback through a capacitor 94. This provides a known integration circuit that integrates the voltage applied at the input 90 over the time. The control electrode of the FET 91 is connected with the arresting input 95. The channel of the FET 91 is normally conducting. It is made nonconducting by an arresting pulse at the arresting input (stop input) 95, so that the output voltage of the operational amplifier 93 then remains constant. In parallel to the capacitor 94 there is connected the normally nonconducting channel of a second FET 96, the control electrode of which is connected with a reset input 97 of the circuit. A reset pulse at this input makes the FET 96 conducting, so that the capacitor 94 is discharged. The output voltage is thereby reset to zero.

Figure 10:
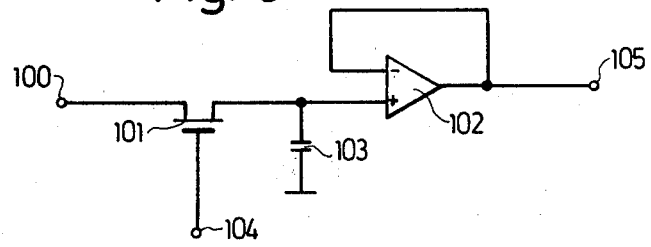
FIG. 10 is an illustrative embodiment of a maximum signal storage circuit (peak store).

The embodiment of a peak voltage storage circuit (peak store) illustrated by way of example in FIG. 10 can be used in FIGS. 1, 4 and 5. The input 100 is connected over the normally nonconducting channel of an FET 101 with an input of an operational amplifier 102 connected as an impedance converter. This input is connected to chassis ground over a storage capacitor 103. If a storage signal is applied to the storage circuit 104 connected to the gate electrode of the FET 101, the latter becomes conducting and the storage capacitor 103 charges up or discharges to the value of the instantaneous input voltage and stores that voltage after the FET 101 is blocked. The output voltage appears at the terminal 105 at the output of the impedance converter 102. The storage signal applied to the gate (control) electrode 104 in the case of the circuit of FIG. 1, for example is the pulse sequence D produced by the monostable flipflop 8 which also arrests the sawtooth generator 10 and thus sets its peak voltage, while the signal applied to the terminal 100 of FIG. 10 is the output of the sawtooth generator 10.

Although the invention has been described with respect to particular embodiments, it will be understood that modifications and variations may be made within the inventive concept.

We claim:

1. Electronic ignition system for an internal combustion engine for control by a transmitting device operated off the crankshaft of the engine, comprising:
   means for generating a first sequence of pulses (C) in response to the output of said transmitting device for ignition timing at low speeds of said engine;

means for generating a second sequence of pulses (B) preceding pulses of said first sequence by a time interval corresponding substantially to a predetermined angle of rotation of said crankshaft;

signal deriving means, including a sawtooth wave generator (10) triggered by said second sequence of pulses and a peak voltage storage circuit (11), for deriving at least one signal from said second sequence of pulses;

signal modifying means for the output of said peak voltage storage circuit (11) for providing at least one modified output signal of said signal deriving means, said signal modifying means including time rate of voltage change modifying means (16) to which the output of said peak voltage storage circuit is supplied and function generator means (17);

means for combining by algebraic addition a plurality of signals representative of engine operating parameters and thereby providing a combined signal;

multiplier means for providing a signal representative of the algebraic product of said combined signal and a signal supplied by said signal deriving means through said peak voltage storage circuit thereof;

comparator means for comparing the output of a sawtooth wave generator in said signal deriving means with a signal derived from said multiplier means to provide a third sequence of pulses (H) for variable advanced timing of engine ignition;

an ignition pulse generator circuit (7); and switchover means (12, 6) responsive to the output of said peak voltage storage circuit (11) for switching the input of said ignition pulse generator circuit (7) from said first (C) to said third (H) sequence of pulses at a predetermined engine speed and for switching the input of said ignition pulse generator circuit (7) from said third (H) to said first (C) sequence of pulses at a predetermined engine speed.

2. Electronic ignition system according to claim 1 in which the output of said voltage change modifying means (16) provides the signal supplied by said signal deriving means to said multiplier means and also supplies the input of said function generator means (17) and in which the output of said function generator means is one of said plurality of signals representative of engine operating parameters combined in said combining means (FIG. 1).

3. Electronic ignition system according to claim 1 in which the output of said signal deriving means supplied to said multiplier means is substantially the output of said peak voltage storage circuit (11) and in which a second algebraic addition combining means (33) is interposed between the output of said multiplier means and an input of said comparator means for combining the output of said multiplier means with second and third derived signals produced respectively by said rate of voltage change modifying means (30) and said function generator means (31), said function generator means (31) having as input the output of said peak voltage storage circuit (11) and providing at its output said second derived signal, said rate of voltage change modifying means (31) including differentiating means responsive to the output of said peak voltage storage circuit (11) for supplying a differentiated signal as said third derived signal to said second combining means (33) (FIG. 3).

4. Electronic ignition system according to claim 1 in which said means for generating a first sequence of pulses (C) and said means for generating said second sequence of pulses (B) are constituted by pulse generator means having a first and a second output for providing said first and second sequences of pulses respectively, said first sequences timed to correspond with the upper deadpoint of each cylinder to be fired and said second sequence timed to correspond with a point in the engine cycle preceding said upper deadpoint by an angle of rotation of the order 30°, in which, further, said second output (3) of said pulse generator means (2) is connected to a first monostable flipflop means (8) the output of which is connected to an arresting input of said sawtooth wave generator (10), with a gate input of said peak voltage storage circuit (11) and with the input of a second monostable flipflop means (9), the output of which is connected to a restart input of said sawtooth wave generator (10), and in which, further, said first output (4) of said pulse generator means (2) is connected directly to said switchover means (6) for switched connection therethrough to said ignition pulse generator circuit (7) (FIGS. 1 and 5).

5. Electronic ignition system according to claim 1 in which said means for generating said second sequence of pulses (B) includes first (108) and second (109) monostable flipflop circuits, said first monostable flipflop circuit (108) being responsive to said first sequence of pulses (C) and said second monostable flipflop circuit (109) being responsive to the output of said first monostable flipflop circuit (108), includes also a second sawtooth wave generator (110) and a second peak voltage storage circuit (111) responsive to the output of said second sawtooth wave generator (110), the output of said second monostable flipflop circuit (109) being supplied to the restart connection of said second sawtooth wave generator (110) and the output of said first monostable flipflop circuit being supplied to an arresting input of said second sawtooth wave generator (110) and to a gate input of said second peak voltage storage circuit (111), and included also a second comparator means (113) having one input connected to the output of said second sawtooth wave generator (110) and its other input connected through a voltage divider (40) to the output of said second peak voltage storage circuit (111), and included also third (8) and fourth (9) monostable fliplop circuits connected to each other and to said first sawtooth wave generator (10) and to said first peak voltage storage means (11) in an arrangement analogous to the connection of said first and second monostable flipflop circuits to each other and to said second sawtooth wave generator (110) and said second peak voltage storage circuit (111), said third monostable flipflop circuit (8) having its input connected to the output of said second comparator means (113) (FIG. 4).

6. Electronic ignition system according to claim 1 for an internal combustion engine having cylinders fired in unsymmetrical sequence, in which said first sequence of pulses, in addition to being supplied to said switchover means (6) for switching to said ignition pulse generator circuit (7) is also supplied to the input of a monostable flipflop circuit (8), in which, further, the output of said monostable flipflop circuit (8) is applied to a first input of a bistable flipflop circuit (59) having its second input supplied with said second sequence of pulses and its output connected to the restart input of said sawtooth wave generator (10), the output of said monostable flipflop circuit (8) being also supplied to an arresting input of said sawtooth wave generator (10) and to a gate input of said peak voltage storage circuit

(11) (FIG. 5).

7. Electronic ignition system according to claim 6 in which a second sawtooth generator (50) is provided in said signal deriving means and has its restart input directly supplied with said second input of pulses (B) and in which the output of said second sawtooth generator (50) is connected to said comparator means for comparing with a signal derived from said multiplier means (FIG. 5).

8. Electronic ignition system for an internal combustion engine for control by a transmitting device operated off the crankshaft of the engine, comprising:

means for generating a first sequence of pulses (B) in response to the output of said transmitting device for ignition timing at high speeds of said engine;

tachometer means responsive to said first sequence of pulses;

function generator means (204) responsive to the output of said tachometer means (200) for providing a derived parameter signal at its output;

combining means for combining by algebraic addition the output of said function generator means (204) with at least one other signal representative of an engine operating parameter to produce a combined signal;

first (201) and second (203) sawtooth wave generators and first (202) and second (13) comparators, said sawtooth wave generators both being controlled with respect of rate of voltage rise by the output of said tachometer means (200) and being respectively controlled with respect to reset by the output of said first (202) and second (13) comparators, the output of said first and second sawtooth generators being supplied respectively as an input to said first and second comparators, said first sawtooth wave generator (201) being supplied with said first sequence of pulses (B) as start pulses and said second sawtooth wave generator (203) being supplied the output of said first comparator as start pulses, first comparator (202) having a second input connected to a predetermined steady voltage ($U_k$), said second comparator (13) having a second input connected to the output of said combining means (33);

an ignition pulse circuit (7); and switchover means (12, 6) responsive to the output of said tachometer means (200) for switching the input of said ignition pulse circuit (7) from said first sequence of pulses (B) to a second sequence of pulses (0), said pulses of said second sequence being the same pulses also provided by the output of said second comparator (13) for resetting said second sawtooth wave generator (10), said switchover means being actuated in response to engine speed in the neighborhood of a predetermined engine speed (FIG. 7).

* * * * *